A. F. LIBBEY.
ARTIFICIAL TEETH.
APPLICATION FILED JUNE 17, 1914.
1,142,897.
Patented June 15, 1915.
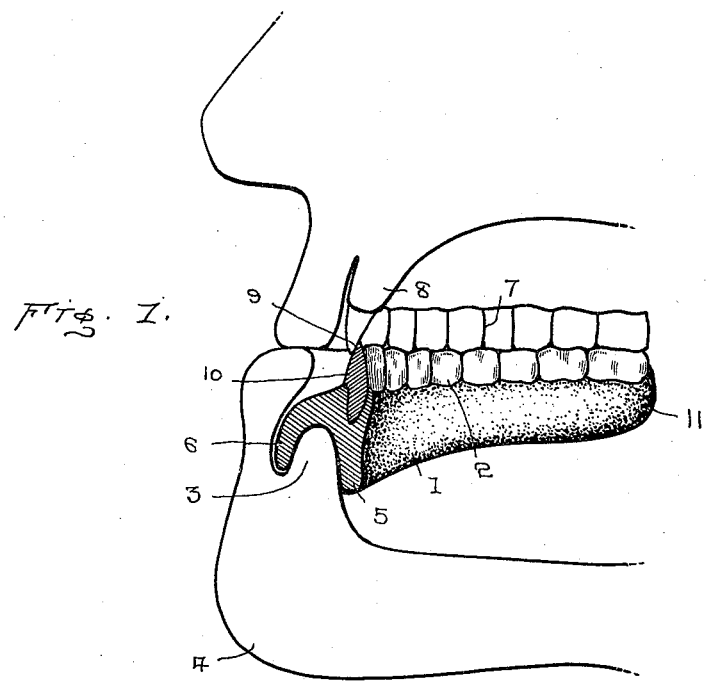
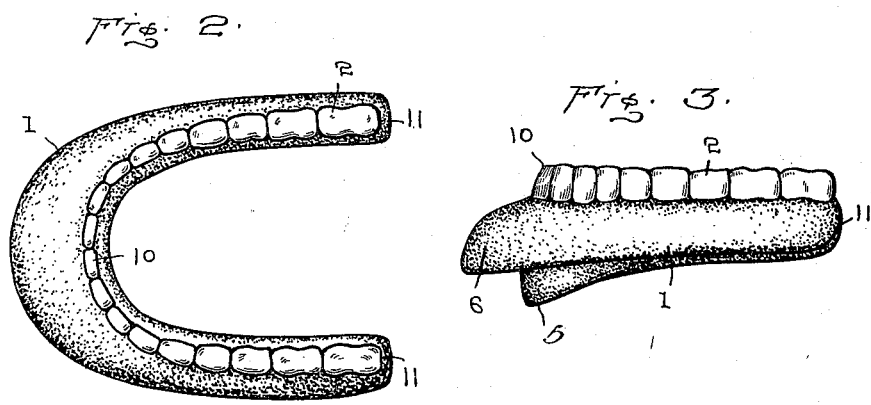

UNITED STATES PATENT OFFICE.

ALBERT F. LIBBEY, OF OLD ORCHARD, MAINE.

ARTIFICIAL TEETH.

1,142,897. Specification of Letters Patent. Patented June 15, 1915.

Application filed June 17, 1914. Serial No. 845,677.

*To all whom it may concern:*

Be it known that I, ALBERT F. LIBBEY, a citizen of the United States, residing at Old Orchard, in the county of York, and State of Maine, have invented certain new and useful Improvements in Artificial Teeth; and I do hereby declare the following to be a full, clear, and exact description of the invention, such as will enable others skilled in the art to which it appertains to make and use the same.

My invention relates to false teeth and in particular to false teeth adapted for malformed lower jaws.

The main object of my invention is to so construct the plate of my false teeth in combination with the position of the teeth therein that a perfect position is had when the "bite" takes place.

A preferred embodiment of my invention is shown and illustrated in the drawings, but I wish it understood that I claim all modifications possible within the scope of the claim appended hereto.

Similar characters of reference refer to similar parts throughout the drawings in which, Figure 1 is a sectional elevation of the human mouth with my device applied thereto. Fig. 2 is a plan view of my device. Fig. 3 is a perspective side elevation.

Referring to the drawing Fig. 1 is my plate composed of any suitable material, and 2, teeth mounted therein. My plate is constructed with the flanges or sides 5 and 6 providing a channel therebetween and adapted to seat over and around the gums 3 of the lower jaw 4, one side 5 of which seating upon the inner face of the gum 3, and the other side 6 seating over the outer face of the gum 3 and adapted to match the contour of the gums so that when a pressure takes place from a bite, a species of suction will be had to hold the plate in proper position. The rear portion of my plate is made shallower than the front portion so that when food is being masticated between the front teeth a moderate pressure will be had on the back teeth so as not to irritate diseased gums.

My device is primarily constructed for what is known as over-shot jaws, the side teeth being mounted in the plate to come approximately directly under the teeth 7 in the upper jaw 8, while the teeth at the front of the plate gradually recede inwardly from the line of the teeth in the upper jaw so as to strike against and scrape along the inner face of the upper teeth, as at 9 in Fig. 1. If desired the lower front teeth 10 can have a partial rearward slope, the outer face of which approximating the contour of the inner face of the upper teeth 7 so that what pressure takes place upon these teeth will be translated to a somewhat rearward movement so that said teeth will bind against each other and thereby assist to reinforce each other in their proper position. It is to be noted that the lower front teeth 10 by this arrangement are offset from the line of the ridge of the gums 3, being rearward to said gums, and on a vertical line with the forward portion of the side 5, this portion of the side 5 being of a greater length than the forward portion of the side 6 provides a broader surface for engaging the inner surface of the gums 3. By this arrangement food is masticated between the lower portion of the inner face of the upper teeth and the upper portion of the outer face of the lower teeth, said lower teeth scraping along the inner face of the upper teeth and thereby thoroughly masticating the food chewed and at the same time the pressure derived from said operation is transferred to all the teeth in unison to reinforce each one in its assembled position and also to retain the plate 1 in the mouth by translating the pressure downwardly at the front part of the plate, thus forcing the extended front portion of the side 5 firmly against the inner surface of the lower gums 3, and effecting a neutral or slightly downward pressure at the rear ends 11 of the plate, this action at the same time causing a suction around the gums 3. By this operation I have a device that is clearly practical, simple in its structure, and yet extremely satisfactory involving, as it does, exact mechanical laws.

Having described my invention what I claim as new and desire to secure by Letters Patent is:—

The combination of a plate having an inner and outer depending flange, and a plurality of teeth mounted in said plate, the front teeth of which being directly disposed vertically above the said inner flange and offset and to the rear of the front teeth in the upper jaw, adapted, when in engagement with the said upper jaw teeth, to transfer the pressure to said inner flange.

In testimony whereof I have signed my name to this specification in the presence of two subscribing witnesses.

ALBERT F. LIBBEY.

Witnesses:
 GRACE D. MILLIKEN,
 W. G. HARMON.

Copies of this patent may be obtained for five cents each, by addressing the "Commissioner of Patents, Washington, D. C."